United States Patent
Ali Khan et al.

(10) Patent No.: US 11,001,247 B2
(45) Date of Patent: May 11, 2021

(54) METHOD FOR SUGGESTING ACTIVATION OF AN EXHAUST BRAKE

(71) Applicant: GM Global Technology Operations LLC, Detroit, MI (US)

(72) Inventors: Maqsood Rizwan Ali Khan, Rochester Hills, MI (US); Mark R. Claywell, Birmingham, MI (US); Ryan Calkin, Oak Park, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 43 days.

(21) Appl. No.: 16/377,878

(22) Filed: Apr. 8, 2019

(65) Prior Publication Data

US 2020/0317184 A1   Oct. 8, 2020

(51) Int. Cl.
*B60W 10/198* (2012.01)
*B60W 30/14* (2006.01)
*B60W 30/18* (2012.01)

(52) U.S. Cl.
CPC ........ *B60W 10/198* (2013.01); *B60W 30/143* (2013.01); *B60W 30/18136* (2013.01); *B60W 2540/12* (2013.01)

(58) Field of Classification Search
CPC ............. B60W 10/198; B60W 30/143; B60W 30/18136; B60W 2540/12
See application file for complete search history.

(56) References Cited

U.S. PATENT DOCUMENTS

| | | | |
|---|---|---|---|
| 5,193,657 A | 3/1993 | Iizuka | |
| 5,315,899 A | 5/1994 | Mochizuki | |
| 2006/0076827 A1* | 4/2006 | Albright | B60T 8/323 303/123 |
| 2010/0030437 A1* | 2/2010 | Kim | F16H 61/0213 701/65 |
| 2011/0040471 A1* | 2/2011 | Krupadanam | F02D 41/0087 701/101 |
| 2014/0358400 A1 | 12/2014 | Whitney et al. | |
| 2017/0297563 A1* | 10/2017 | Kava | B60W 10/11 |
| 2019/0299947 A1* | 10/2019 | Higashitani | B60T 7/20 |
| 2020/0164875 A1* | 5/2020 | Oberg | B60T 8/18 |
| 2020/0165985 A1* | 5/2020 | Jin | B60W 30/146 |

FOREIGN PATENT DOCUMENTS

| | | | | |
|---|---|---|---|---|
| CN | 109339956 A | * | 2/2019 | |
| JP | S59141739 A | * | 8/1984 | ............... F02D 9/06 |
| KR | 20000074791 A | * | 12/2000 | |

OTHER PUBLICATIONS

Machine Translation of CN-109339956-A (Year: 2019).*
Machine Translation of KR-20000074791-A (Year: 2000).*
Machine Translation of JPS59141739A (Year: 1984).*

* cited by examiner

*Primary Examiner* — Anne Marie Antonucci
*Assistant Examiner* — Sahar Motazedi
(74) *Attorney, Agent, or Firm* — Quinn IP Law

(57) ABSTRACT

A method for exhaust braking includes monitoring, by a controller of a vehicle, an engine speed of an internal combustion engine; comparing, by the controller, the engine speed with the a predetermined braking speed threshold to determine whether the engine speed is greater than the a predetermined braking speed threshold; and, in response to determining that the engine speed is greater than the a predetermined braking speed threshold, switching the vehicle to an exhaust braking mode.

11 Claims, 2 Drawing Sheets

METHOD FOR SUGGESTING ACTIVATION OF AN EXHAUST BRAKE

INTRODUCTION

The present disclosure relates to a method for suggesting activation of exhaust braking.

Exhaust braking is useful to decelerate a vehicle in certain circumstances. It is therefore desirable to develop a method for suggesting the vehicle operator to activate exhaust braking when certain circumstances are detected.

SUMMARY

The present disclosure generally relates to a method for exhaust braking. In a diesel engine, the vehicle operator may have to manually engage exhaust braking through either a switch or a dial in the vehicle. In the event the vehicle requires exhaust braking and the vehicle operator forgets to engage exhaust braking, the engine could over-speed and damage the bearing. The presently disclosed method tracks ways of detecting a vehicle that requires exhaust braking and prompts the vehicle operator to engage exhaust braking. Beneficially, the presently disclosed method protects the engine and minimizes stress on the engine especially for higher towing capacity. The presently disclosed method identifies the vehicle through various means, including, but not limited to, use of a rearview camera to identify a trailer hooked to the vehicle; road load calculation; comparing the cruise control speed with the true vehicle speed to identify a possible runaway; slope grade of the road; look ahead GPS data if high terrain or hills are approaching; and a combination of the above.

The presently disclosed method for exhaust braking includes: monitoring, by a controller of a vehicle, the engine speed of an internal combustion engine; comparing, by the controller, the engine speed with a predetermined braking speed threshold to determine whether the engine speed is greater than the predetermined braking speed threshold; and, in response to determining that the engine speed is greater than the predetermined braking speed threshold, switching the vehicle to an exhaust braking mode.

The method may further include monitoring a vehicle speed of the vehicle. The method may further include determining whether a cruise control mode of the vehicle is on. In response to determining that the cruise control mode of the vehicle is on, the method may further include comparing the vehicle speed with a sum of a cruise control set speed of the cruise control mode and a predetermined speed margin to determine whether the vehicle speed is greater than the sum of the cruise control set speed and the predetermined speed margin. Switching to the exhaust braking mode occurs in response to: determining that the engine speed is greater than the predetermined braking speed threshold; and determining that the vehicle speed is greater than the cruise control set speed. The method may further include updating a head-up display of the vehicle to show that the exhaust braking should be activated. Switching to the exhaust braking mode may include activating exhaust braking of the vehicle to decelerate the vehicle. The method may further include updating a head-up display of the vehicle to show that the exhaust braking has been activated. The method may further include receiving images from a rearview camera of the vehicle. The method may further include detecting a trailer using the images captured by the rearview camera of the vehicle.

The method may further include monitoring a vehicle speed of the vehicle and determining whether a cruise control mode of the vehicle is activated. The method may further include comparing the vehicle speed of the vehicle with a cruise control set speed in response to determining that the cruise control mode of the vehicle is activated. The method may further include determining that the vehicle speed is greater than the cruise control set speed. Switching to the exhaust braking mode may occur in response to: determining that the engine speed is greater than the predetermined braking speed threshold; and determining that the vehicle speed is greater than the cruise control set speed.

Switching, by the controller, the vehicle to the exhaust braking mode may include activating exhaust braking to decelerate the vehicle. The method may further include updating a head-up display of the vehicle to show that the exhaust braking has been activated. The method may further include monitoring Global Positioning System (GPS) data received from a GPS device of the vehicle. The GPS data includes road slope grade data, and the road slope grade data is data indicative of a road slope grade of a road on which the vehicle is currently traveling and/or the road slope grade data is data indicative of a road slope grade of a road that is a predetermined distance ahead of the vehicle. The method may further include comparing the road slope grade with a predetermined grade threshold. The method may further include determining that the road slope grade is greater than the predetermined grade threshold. The method may include switching the vehicle to the exhaust braking mode in response to determining that the road slope grade is greater than the predetermined grade threshold. Switching the vehicle to the exhaust braking mode may include activating the vehicle to the exhaust braking mode to decelerate the vehicle. The method may further include updating a head-up display of the vehicle to show that the exhaust braking has been activated.

The present disclosure also includes a vehicle system. The vehicle system includes a plurality of sensors. The sensors include an engine speed sensor and vehicle speed sensor. The vehicle system further includes a controller in communication with the sensors. The controller is programmed to execute the method described above.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

The following detailed description is merely exemplary in nature and is not intended to limit the application and uses. Furthermore, there is no intention to be bound by expressed or implied theory presented in the preceding sections or the following detailed description. As used herein, the term "module" refers to hardware, software, firmware, electronic control component, processing logic, and/or processor device, individually or in a combination thereof, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

Figure 1:
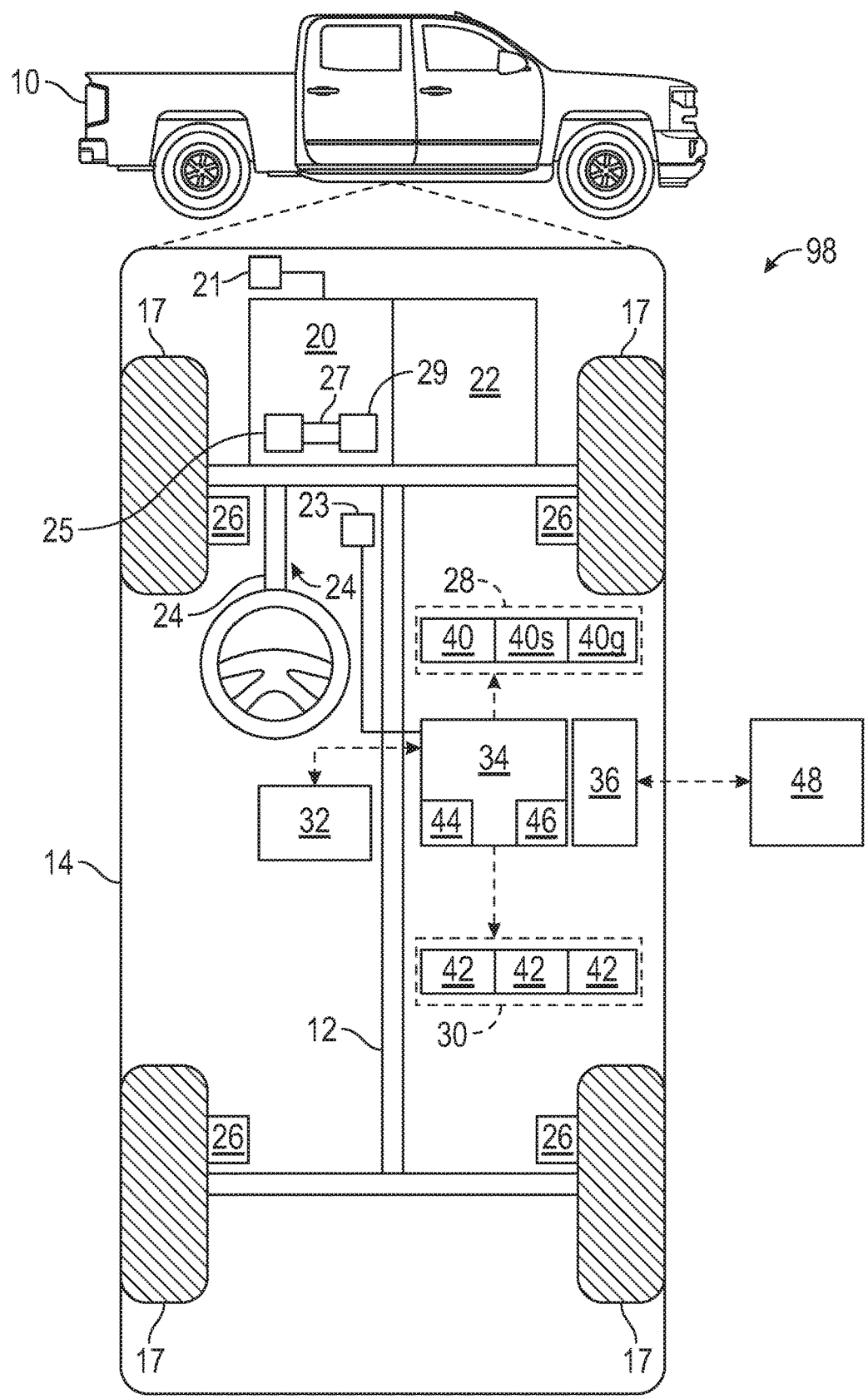
FIG. 1 is a schematic block diagram of a vehicle.

As depicted in FIG. 1, the vehicle 10 generally includes a chassis 12, a body 14, front and rear wheels 17 and may be referred to as the host vehicle. The body 14 is arranged on the chassis 12 and substantially encloses components of the vehicle 10. The body 14 and the chassis 12 may jointly form a frame. The wheels 17 are each rotationally coupled to the chassis 12 near a respective corner of the body 14.

In various embodiments, the vehicle 10 may be an autonomous vehicle and a control system 98 is incorporated into the vehicle 10. The control system 98 may be simply referred to as the system or vehicle system. The control system 98 includes a cruise control system. The cruise control system allows the vehicle 10 to enter a cruise control mode and set a cruise set control speed. In the cruise control mode, the vehicle operator may set a cruise control set speed. Then, upon activation of the cruise control mode, the vehicle 10 maintains the cruise control set speed without the need to presses the brake pedal or acceleration pedal. The vehicle 10 is, for example, a vehicle that is automatically controlled to carry passengers from one location to another. The vehicle 10 is depicted in the illustrated embodiment as a passenger car, but it should be appreciated that another vehicle including motorcycles, trucks, sport utility vehicles (SUVs), recreational vehicles (RVs), marine vessels, aircraft, etc., can also be used. In an exemplary embodiment, the vehicle 10 is a so-called Level Four or Level Five automation system. A Level Four system indicates "high automation", referring to the driving mode-specific performance by an automated driving system of aspects of the dynamic driving task, even if a human driver does not respond appropriately to a request to intervene. A Level Five system indicates "full automation", referring to the full-time performance by an automated driving system of aspects of the dynamic driving task under a number of roadway and environmental conditions that can be managed by a human driver.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an electric machine such as a traction motor and/or a fuel cell propulsion system. The vehicle 10 further includes a battery (or battery pack) 21 electrically connected to the propulsion system 20. Accordingly, the battery 21 is configured to store electrical energy and to provide electrical energy to the propulsion system 20. Additionally, the propulsion system 20 may include an internal combustion engine 25. The internal combustion engine 25 may be a diesel engine. The propulsion system 20 includes an engine brake 27 fluidly coupled between the internal combustion engine 25 and an exhaust manifold 29. The engine brake 27 may be referred to as an exhaust brake and is a valve configured to move between an open position and a closed position. In the closed position, the engine brake 27 precludes the exhaust gases from fluid from the internal combustion engine 25 to the exhaust manifold 29. The transmission system 22 is configured to transmit power from the propulsion system 20 to the vehicle wheels 17 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 17. The brake system 26 may, in various embodiments, include friction brakes, brake by wire, a regenerative braking system such as an electric machine, and/or other appropriate braking systems. The steering system 24 influences a position of the vehicle wheels 17. While depicted as including a steering wheel for illustrative purposes, in some embodiments contemplated within the scope of the present disclosure, the steering system 24 may not include a steering wheel.

The sensor system 28 includes one or more sensors 40 (i.e., sensing devices) that sense observable conditions of the exterior environment and/or the interior environment of the vehicle 10. The sensors 40 may include, but are not limited to, radars, lidars, Global Positioning System (GPS) devices, one or more cameras (e.g., optical cameras and/or thermal cameras), ultrasonic sensors, one or more engine speed sensors for measuring the engine speed of the internal combustion engine 25, and/or other sensors. The sensors 40 also include a rearview camera for capturing images behind the vehicle 10 and a front-view camera for capturing images in front of the vehicle 10. The sensors 40 may include gyroscopes for measures a road slope grade and/or an internal measuring unit (IMU) for measuring the accelerator and the motion angle of the vehicle 10. The IMU may include an accelerometer for measuring the acceleration of the vehicle 10 and one or more gyroscopes for measuring the angle of the vehicle 10. The IMU may also measure the road slope grade of the road that the vehicle 10 is traveling on. The sensors 40 may also include one or more accelerometers, which may be used to measure the road slope grade. The sensors 40 may include one or more GPS devices 40g. The GPS device 40g may be used to look ahead of the terrain to detect approaching hills or high terrain and therefore determine the road slope grade. The actuator system 30 includes one or more actuator devices 42 that control one or more vehicle features such as, but not limited to, the propulsion system 20, the transmission system 22, the steering system 24, and the brake system 26. In various embodiments, the vehicle features can further include interior and/or exterior vehicle features such as, but not limited to, doors, a trunk, and cabin features such as air, music, lighting, etc. (not numbered). The sensing system 28 includes one or more Global Positioning System (GPS) transceivers 40g configured to detect and monitor the route data (i.e., route information). The GPS transceiver 40g is configured to communicate with a GPS to locate the position of the vehicle 10 in the globe. The GPS transceiver 40g is in electronic communication with the controller 34. Because the sensor system 28 provides object data to the controller 34, the sensor system 28 and its sensors 40 are considered sources of information (or simply sources).

The data storage device 32 stores data for use in automatically controlling the vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and a separate system.

The controller 34 includes at least one processor 44 and a non-transitory computer readable storage device or media 46. The processor 44 can be a custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although a single controller 34 is shown in FIG. 1, embodiments of the vehicle 10 may include a number of controllers 34 that communicate over a suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the control system 98. The vehicle 10 includes a user interface 23, which may be a head-up display and/or a touchscreen in the dashboard. The user interface 23 is in electronic communication with the controller 34 and is configured to receive inputs by a user (e.g., vehicle operator). Accordingly, the controller 34 is configured to receive inputs from the user via the user interface 23. The user interface 23 includes a head-up display configured to display information to the user (e.g., vehicle operator or passenger).

Figure 2:
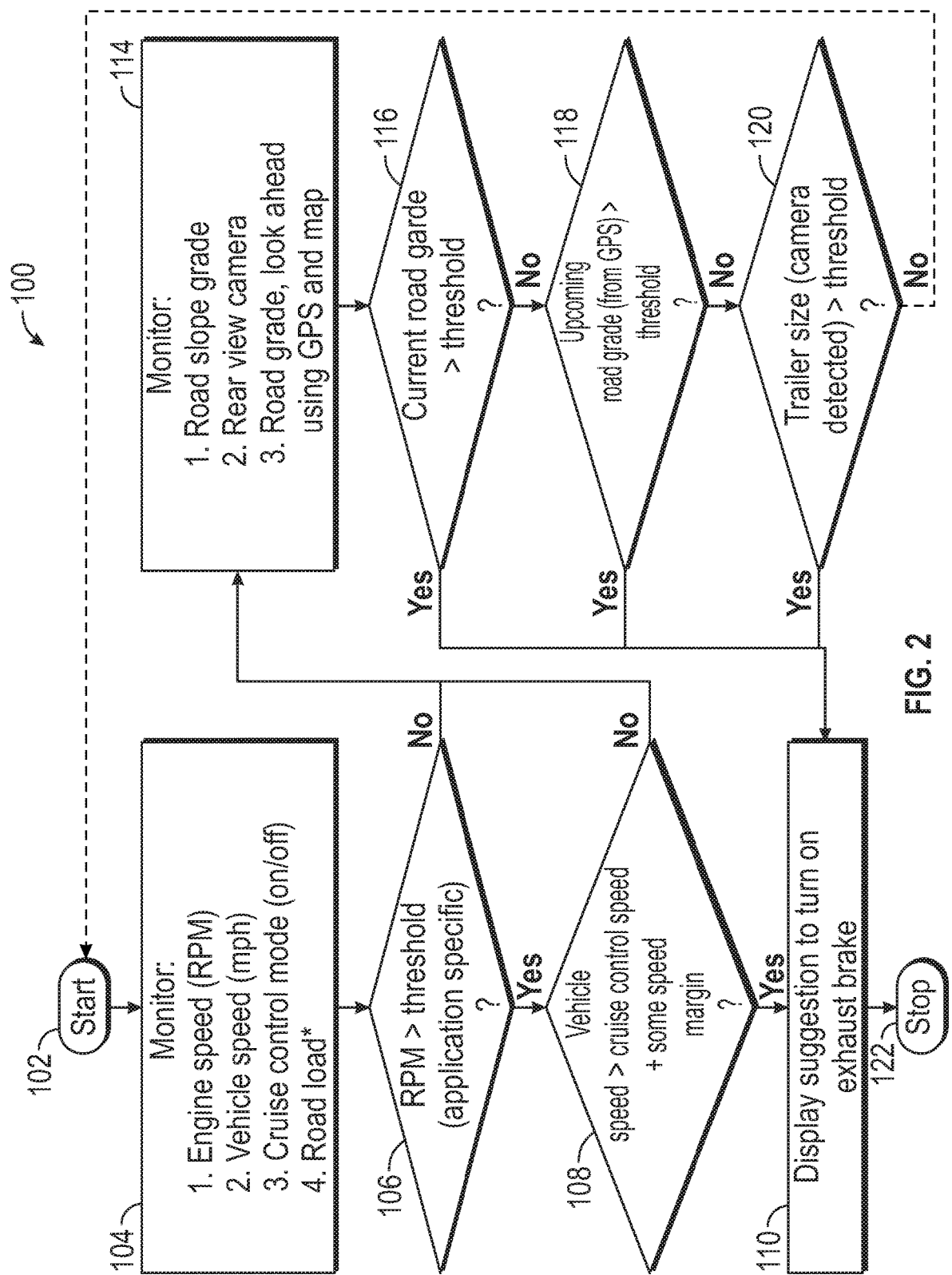
FIG. 2 is a flowchart of a method for activating exhaust braking.

The communication system 36 is configured to wirelessly communicate information to and from other entities 48, such as but not limited to, other vehicles ("V2V" communication), infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication system 36 may include one or more antennas and/or transceivers for receiving and/or transmitting signals, such as cooperative sensing messages (CSMs).

FIG. 1 is a schematic block diagram of the control system 98, which is configured to control the vehicle 10. The controller 34 of the control system 98 is in electronic communication with the braking system 26, the propulsion system 20, and the sensor system 28. The braking system 26 includes one or more brake actuators (e.g., brake calipers) coupled to one or more wheels 17. Upon actuation, the brake actuators apply braking pressure on one or more wheels 17 to decelerate the vehicle 10. The propulsion system 20 includes one or more propulsion actuators for controlling the propulsion of the vehicle 10. For example, as discussed above, the propulsion system 20 may include an internal combustion engine and, in that case, the propulsion actuator may be a throttle configured to control the airflow in the internal combustion engine. The sensor system 28 may include one or more accelerometers (or one or more gyroscopes) coupled to one or more wheels 17. The accelerometer is in electronic communication with the controller 34 and is configured to measure and monitor the longitudinal and lateral accelerations of the vehicle 10. The sensor system 28 may include one or more vehicle speed sensors 40s configured to measure the speed (or velocity) of the vehicle 10. The vehicle speed sensor is coupled to the controller 34 and is in electronic communication with one or more wheels 17.

With reference to FIG. 2, a method 100 for exhaust braking is shown. The method 100 begins at block 102. After block 102, the method 100 proceeds to block 104. Block 104 entails monitoring, by the controller 34 of the vehicle 10, an engine speed (e.g., revolutions per minute (RPM)) of an internal combustion engine 25. The controller 34 may receive the engine speed from the engine speed sensor (i.e., one of the sensors 40). Block 104 also entails monitoring, by the controller 34 of the vehicle 10, a vehicle speed (e.g., miles per hour (mpg)) of the vehicle 10. To do so, the controller 34 may receive the vehicle speed from the speed sensor (i.e., one of the sensors 40). Block 104 also entails determining, by the controller 34, whether the cruise control mode is on (i.e., activated). Block 104 may also entail monitoring the road load when the cruise control mode is off. The road load is the output torque produced by the vehicle 10, which may be determined by the controller 34. After block 104, the method 100 proceeds to block 106.

At block 106, the controller 34 compares the engine speed with a predetermined braking speed threshold to determine whether the engine speed is greater than the predetermined braking speed threshold. The predetermined braking speed is application specific and may be determined by testing the vehicle 10. After block 106, the method 100 proceeds to block 108.

At block 108, the controller 34 compares the vehicle speed of the vehicle 10 with the sum of the cruise control set speed and a predetermined speed margin to identify a possible runaway condition (i.e., to determine whether the vehicle speed is greater than the sum of the cruise control set speed and the predetermined speed margin) in response to determining that the cruise control mode is on. As discussed above, the vehicle operator may set the cruise control set speed through the user interface 23. Then, the method 100 proceeds to block 110.

At block 110, the controller 34 switches the vehicle 10 to the exhaust braking mode in response to: (1) determining the engine speed is greater than the predetermined braking speed threshold; and (2) determining that the vehicle speed of the vehicle 10 is greater than the sum of the cruise control set speed and a predetermined speed margin. In some embodiments, switching the vehicle 10 to the exhaust braking mode entails activating the exhaust braking of the vehicle 10 to decelerate the vehicle 10. The term "exhaust braking" means slowing a diesel engine by closing off the exhaust path from the engine, causing the exhaust gases to be compressed in the exhaust manifold, and in the cylinder. To do so, the engine brake 27 switches from its open position to the closed position to close off the exhaust path from the internal combustion engine 25. After block 110, the method 100 proceed to block 112.

Further at block 110, the controller 34 commands the head-up display (or another display) of the user interface 23 to update in order to show that the exhaust braking should be activated. To do so, the user interface 23 (e.g., head-up display or instrument panel) may display (or show in some other way) a symbol indicative of exhaust braking to indicate to the vehicle operator that exhaust braking should be activated. In other words, a suggestion is made (through the user-interface 23) that the exhaust braking should be activated. Alternatively, the controller 34 commands the head-up display (or another display) of the user interface 23 to show that the exhaust braking of the vehicle 10 has been activated after the controller 34 automatically activates exhaust braking. To do so, the head-up display of the user interface 23 may show a symbol indicative of exhaust braking to indicate to the vehicle operator that exhaust braking has been activated. Then, the method 100 may end at block 118. However, the method 100 includes another path that starts at block 114.

At block 114, the controller 34 monitors a road slope grade of the road that the vehicle 10 is currently traveling on. To do so, the controller 34 may monitor Global Positioning System (GPS) data received from the GPS device 40g of the vehicle 10. The GPS device 40g includes a transmitter to receive GPS data from a GPS. The GPS data includes road slope grade data. The road slope grade data is data indicative of a road slope grade of a road on which the vehicle is traveling. The controller 34 may additionally or alternatively receive the road slope grade from other sensors 40, such as IMU, accelerometers, and/or gyroscopes. At block 114, the controller 34 may also determine where a trailer is attached to rear of the vehicle 10 using one of the sensors 40 (e.g., a rearview camera). To do so, the controller 34 receives images captured by the rearview camera of the vehicle 10. At block 114, the controller 34 also monitors the road slope grade of the road that is a predetermined distance ahead of the vehicle 10 using one or more sensors 40, such as the GPS device 40g. The predetermined distance may be obtained by testing the vehicle 10. Then, the method 100 proceeds to block 116.

At block 116, the controller 34 compares the road slope grade of the road that the vehicle 10 is currently traveling on with a first predetermined-slope threshold. The first predetermined-slope threshold may be obtained by testing the vehicle 10. If the road slope grade of the road that the vehicle 10 is currently traveling on is greater than the first predetermined-slope threshold, then the method 100 proceeds to block 110. If the road slope grade of the road that the vehicle 10 is currently traveling on is not greater than the first predetermined-slope threshold, then the method 100 proceeds to block 118.

At block 118, the controller 34 compares the road slope grade of the road that is the predetermined distance ahead of the vehicle 10 with a second predetermined-slope threshold. If the road slope grade of the road that is the predetermined distance ahead of the vehicle 10 is greater than the second predetermined-slope threshold, then the method 100 proceeds to block 110. If the road slope grade of the road that is the predetermined distance ahead of the vehicle 10 is not greater than the second predetermined-slope threshold, then the method 100 proceeds to block 120.

At block 120, the controller 34 determines whether a trailer is detected using the images captured by the rearview camera (i.e., one of the sensors 40). If the trailer is detected, then the controller 34 determines the size of the trailer using the images captured by the rearview camera (i.e., one of the sensors 40). If the size of the trailer attached to the vehicle 10 is greater than a predetermined size threshold, then the method 100 proceeds to block 110. If the size of the trailer attached to the vehicle 10 is not greater than the predetermined size threshold, then the method 100 returns to block 102.

The detailed description and the drawings or figures are a supportive description of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for exhaust braking, comprising:
monitoring, by a controller of a vehicle, an engine speed of an internal combustion engine;
comparing, by the controller, the engine speed with a predetermined braking speed threshold to determine whether the engine speed is greater than the predetermined braking speed threshold; and
in response to determining that the engine speed is greater than the predetermined braking speed threshold, switching the vehicle to an exhaust braking mode;
in response to determining that the engine speed is not greater than the predetermined braking speed threshold, monitoring Global Positioning System (GPS) data received from a GPS device of the vehicle, wherein the GPS data includes road slope grade data, and the road slope grade data is data indicative of: (1) a road slope grade of a road on which the vehicle is currently traveling and (2) a road slope grade of a road that is a predetermined distance ahead of the vehicle;

comparing the road slope grade of the road that the vehicle is currently traveling on with a first predetermined-slope threshold;

determining that the road slope grade of the road that the vehicle is currently traveling on is not greater than the first predetermined-slope threshold;

in response to determining that the road slope grade of the road that the vehicle is currently traveling on is not greater than the first predetermined-slope threshold, comparing the road slope grade of the road that is at the predetermined distance ahead of the vehicle with a second predetermined-slope threshold;

receiving images from the rearview camera of the vehicle;

detecting a trailer using the images captured by the rearview camera of the vehicle in response to determining that the road slope grade of the road that is at the predetermined distance ahead of the vehicle is not greater than the second predetermined-slope threshold;

in response to determining that the road slope grade of the road that is at the predetermined distance ahead of the vehicle is greater than the second predetermined-slope threshold, switching the vehicle to the exhaust braking mode, wherein the switching the vehicle to the exhaust braking mode includes activating the exhaust braking of the vehicle to decelerate the vehicle.

2. The method of claim 1, further comprising monitoring a vehicle speed of the vehicle.

3. The method of claim 2, further comprising determining whether a cruise control mode of the vehicle is on.

4. The method of claim 3, further comprising, in response to determining that the cruise control mode of the vehicle is on, comparing the vehicle speed with a sum of a cruise control set speed and a predetermined speed margin to determine whether the vehicle speed is greater than the sum of the cruise control set speed and the predetermined speed margin.

5. The method of claim 4, further comprising updating a head-up display of the vehicle to show that the exhaust braking should be activated.

6. The method of claim 1, further comprising: updating a head-up display of the vehicle to show that the exhaust braking has been activated.

7. A vehicle system, comprising:
a plurality of sensors, wherein the plurality of sensors includes an engine speed sensor, a rearview camera, and a vehicle speed sensor; and
a controller in communication with the plurality of sensors, wherein the controller is programmed to:
monitor an engine speed of an internal combustion engine;
compare the engine speed with a predetermined braking speed threshold to determine whether the engine speed is greater than the predetermined braking speed threshold; and
in response to determining that the engine speed is greater than the predetermined braking speed threshold, switch the vehicle system to an exhaust braking mode;
in response to determining that the engine speed is not greater than the predetermined braking speed threshold, monitor Global Positioning System (GPS) data received from a GPS device of the vehicle system, wherein the GPS data includes road slope grade data, and the road slope grade data is data indicative of: (1) a road slope grade of a road on which the vehicle system is currently traveling and (2) a road slope grade of a road that is at a predetermined distance ahead of the vehicle system;

compare the road slope grade of the road that the vehicle system is currently traveling on with a first predetermined-slope threshold;

determine that the road slope grade of the road that the vehicle system is currently traveling on is not greater than the first predetermined-slope threshold;

in response to determining that the road slope grade of the road that the vehicle system is currently traveling on is not greater than the first predetermined-slope threshold, compare the road slope grade of the road that is at the predetermined distance ahead of the vehicle system with a second predetermined-slope threshold;

determine that the road slope grade of the road that is at the predetermined distance ahead of the vehicle system is not greater than the second predetermined-slope threshold;

receive images from the rearview camera of the vehicle system;

detect a trailer using the images captured by the rearview camera of the vehicle system;

wherein the controller detects the trailer using the images captured by the rearview camera of the vehicle system in response to determining that the road slope grade of the road that is at the predetermined distance ahead of the vehicle system is not greater than the second predetermined-slope threshold;

in response to detecting the trailer, determine a size of the trailer using the images captured by the rearview camera;

determine that the size of the trailer is greater than a predetermined size threshold;

and in response to determining that the size of the trailer is greater than the predetermined size threshold, command a head-up display of the vehicle system to update in order to show that an exhaust braking should be activated.

8. The vehicle system of claim 7, wherein the controller is further programmed to monitor a vehicle speed of the vehicle system.

9. The vehicle system of claim 8, wherein the controller is further programmed to determine whether a cruise control mode of the vehicle system is on.

10. The vehicle system of claim 9, wherein the controller is further programmed to, in response to determining that the cruise control mode of the vehicle system is on, compare the vehicle speed with a sum of a cruise control set speed and a predetermined speed margin to determine whether the vehicle speed is greater than the sum of the cruise control set speed and the predetermined speed margin.

11. The vehicle system of claim 10, wherein the controller is programmed to switch the vehicle system to the exhaust braking mode further in response to:
determining that the engine speed is greater than the predetermined braking speed threshold; and
determining that the vehicle speed is greater than the sum of the cruise control set speed and the predetermined speed margin.

* * * * *